(12) United States Patent
Korol et al.

(10) Patent No.: US 11,762,488 B1
(45) Date of Patent: Sep. 19, 2023

(54) TOUCH-SENSITIVE COMPUTING INPUT DEVICE ACTIVATOR

(71) Applicant: Work-Life Balance Corporation LLC, San Diego, CA (US)

(72) Inventors: Evgeny Korol, San Diego, CA (US); Victor Korol, San Diego, CA (US)

(73) Assignee: WORK-LIFE BALANCE CORPORATION LLC, San Diego, CA (US)

( * ) Notice: Subject to any disclaimer, the term of this patent is extended or adjusted under 35 U.S.C. 154(b) by 0 days.

(21) Appl. No.: 17/863,738

(22) Filed: Jul. 13, 2022

(51) Int. Cl.
*G06F 3/039* (2013.01)
*G06F 9/4401* (2018.01)
*G06F 3/0354* (2013.01)

(52) U.S. Cl.
CPC .......... *G06F 3/0393* (2019.05); *G06F 9/4418* (2013.01); *G06F 3/03547* (2013.01)

(58) Field of Classification Search
CPC ..... G06F 9/4418; G06F 3/0393; G06F 3/0338
See application file for complete search history.

(56) References Cited

U.S. PATENT DOCUMENTS

| 10,572,270 | B1* | 2/2020 | Sampath | G06F 9/4418 |
| 2011/0227841 | A1* | 9/2011 | Argiro | G06F 3/0393 345/173 |
| 2014/0253445 | A1* | 9/2014 | Petersen | G06F 3/0393 345/157 |
| 2017/0329949 | A1* | 11/2017 | Civelli | G06F 9/4418 |

* cited by examiner

*Primary Examiner* — Kevin M Nguyen
(74) *Attorney, Agent, or Firm* — Anatoly S. Weiser, Esq.; IPLCounsel.com (57) ABSTRACT

A device for simulating finger movement on a computer touchpad prevents the computer attached to the touchpad from falling asleep or locking. The device includes a small motor that moves a weight inside the device and thereby changes the location of the center of gravity of the device, causing the device to tilt in different directions when the device is placed on the touchpad. The lower support of the device is conductive, e.g., metalized, so that the changes in the location of the contact patch between the device and the touchpad simulate finger movements on the touchpad. The small motor may be an electric motor, such as a wall/desk clock motor powered by an AA battery, or a mechanical wind-up movement. In examples, the simulated finger movement is linear or circular.

20 Claims, 12 Drawing Sheets

TOUCH-SENSITIVE COMPUTING INPUT DEVICE ACTIVATOR

FIELD OF THE DISCLOSURE

This disclosure relates generally to the field of computer peripherals. Selected of the disclosed embodiments relate to apparatus and methods for automatic, continuous, occasional, or periodic simulation of finger movements on touchpads used as computer pointing devices, to prevent the computers associated with the touchpads from turning themselves off, locking-up so as to require a password for unlocking, entering hibernation states, entering dark screen states, entering other reduced power consumption states, or similarly "falling asleep" due to user inactivity.

BACKGROUND

A typical computing system uses a pointing device, which may be a built-in device or an add-on peripheral. Pointing devices include computer mice, trackballs, touchscreens, and touchpads. A touchpad allows a computer user to provide computer input by, for example, sliding a finger, sliding two or more fingers (making a "touchpad gesture" or simply a "gesture"), or tapping on the touchpad. There may also be other types of user input, such as keyboard commands.

The computing system may be preprogrammed with one or more settings that determine the time period (or periods, as the case may be) after which the computer will fall asleep (as this term was explained above) in the absence of user activity. Examples of such "inactivity time settings" are Power & sleep settings of Windows® 10.

At times, the tendency of a computing system to fall asleep is quite annoying to the user, for example, during a ZOOM or other conferencing sessions. But the user might not have the access to the inactivity time settings. For example, a company's IT policy might not allow the user to program own settings of various operational parameters, including the inactivity time settings.

Similarly, the company's IT policy might not allow the user to install software that would simulate user input or other activity.

Additionally, the user might want to prevent the computing device from falling asleep only temporarily, without the inconvenience of changing the settings and taking the risk of forgetting to change the settings back to the original values.

Mouse jigglers/wigglers exist, such as a device from Work-Life Balance Corporation available through Amazon®. Such devices, however, are designed to simulate user activity through a computing system's mouse, not a touchpad.

Additional techniques, devices, and methods are needed in the art to provide reliable, software-independent, low-power methods and devices to simulate user input through touchpads.

SUMMARY

This document describes embodiments, variants, implementations, and examples effectuating novel techniques for addressing one or more of the needs identified above, and/or other needs. Selected embodiments described in this document include apparatus and methods that simulate computer input through touchpads or touchscreens to prevent computing devices from falling asleep. Some techniques employ a small motor that effects change of center of gravity of the entire device (including the device's battery, if the battery is included within the device), thereby causing the device to rock or roll on its lower support. The support is metalized or otherwise made conductive, so that the changes in location/area of the contact patch between the device and the touchpad/touchscreen simulate finger movement on the touchpad/touchscreen.

In an embodiment, a device for simulating user activity on a horizontally-placed touchpad includes a movement mechanism with a shaft rotated by the movement mechanism when the movement mechanism is energized and allowed to operate. The device also includes an arm that has a first end and a second end, with the first end attached to the shaft so that rotation of the shaft causes the second end to revolve around the shaft in a plane normal to the shaft. The device additionally includes a base supporting the movement mechanism when the device rests on the touchpad. The base includes an electrically conductive lower portion that touches the touchpad when the device rests on the touchpad. The electrically conductive lower portion has an area sufficient to simulate finger touch on the touchpad when the electrically conductive portion contacts the touchpad. When the second end revolves around the shaft, it changes the center of gravity of the device and the device consequently tilts in different directions. This causes the electrically conductive lower portion to contact the touchpad in different locations and thereby simulates finger movement on the touchpad.

In aspects, the movement mechanism is a mechanical movement mechanism. The mechanical movement mechanism may include a wind-up spring mechanism.

In aspects, the movement mechanism includes an electrical motor. The movement mechanism may also include one or more reduction gears between the electrical motor and the shaft, so that the electrical motor drives the shaft through the one or more reduction gears.

In aspects, the movement mechanism (whether electrical or mechanical) is configured to rotate the shaft at 0.4 rpm or faster.

In aspects, the movement mechanism (whether electrical or mechanical) is configured to rotate the shaft at between 0.9 to 1.1 rpm.

In aspects, the movement mechanism (whether electrical or mechanical) is designed for operating clocks, such as wall and desk clocks. Frequency stabilization components of such movement mechanism may be omitted. The shaft may be designed for rotating a clock second hand.

In aspects, the electrically conductive lower portion includes a flat disk and a conical band.

In aspects, the device also includes an upper cover designed to mate with the base so that the movement mechanism is enclosed by the base and the upper cover, and the upper cover fixes the movement mechanism in the vertical direction when the upper cover is mated to the base.

In aspects, the device also includes a weight attached to the second end of the arm, to amplify changes in location of the center of gravity of the device with rotation of the arm.

In aspects, the electrically conductive lower portion includes a ski component. The ski component may include a convex constant-width arc-shaped portion on which the device is balanced for all or at least some angular locations of the arm when the device is placed on the touchpad. The rotation of the arm causes the device to rock back and forth along the ski. The constant width of the ski may be less than one-third of the width of the device. The ski may be off-center so that length-wise center line of the ski is nearer one side of the device than an opposite side of the device.

In aspects, the device may also include an upper cover configured to mate with the base so that the movement mechanism is enclosed by the base and the upper cover, and the upper cover fixes the movement mechanism in the vertical direction when the upper cover is mated to the base.

In aspects, the device also includes a metal weight mounted on the base or on the upper cover, to change the center of gravity of the device.

In aspects, the base also includes a first support on a first side of the ski and a second support on a second side of the ski.

In an embodiment, an apparatus for simulating finger movement on a horizontally-placed touch-sensitive computing input device includes a body having a conductive lower portion, a weight inside the body, and a movement mechanism configured to move the weight inside the body thereby causing changes in location of the center of gravity of the apparatus in the horizontal plane when the apparatus is placed on the touch-sensitive computing input device. The region of the touch-sensitive computing input device that is in contact with the conductive lower portion when the apparatus is placed on the touch-sensitive computing input device changes in response to the changes in the location of the center of gravity, thereby causing a computing apparatus coupled to the touch-sensitive computing input device to detect apparent finger movement on the touch-sensitive computing input device. The touch-sensitive computing input device may be, for example, a touchpad or a touchscreen.

In an embodiment, a method for simulating finger movement on a horizontally-placed touch-sensitive computing input device includes the following steps: placing an apparatus on the touch-sensitive computing input device, the apparatus having a body with a lower conductive portion that comes into contact with the touch-sensitive computing input device when the apparatus is placed on the touch-sensitive computing input device, a weight movable inside the body, and a movement mechanism attached to the weight and configured to move the weight when the movement mechanism is energized; and energizing the movement mechanism to move the weight inside the body and generate horizontal changes in the center of gravity of the apparatus, the changes in the center of gravity of the apparatus causing the apparatus to tilt or rock in different directions on the touch-sensitive computing input device and thereby vary location of the touch-sensitive computing input device that is contact with the lower conductive portion so that a computing apparatus receiving input from the touch-sensitive computing input device detects apparent finger movements on the touch-sensitive computing input device. The touch-sensitive computing input device may be, for example, a touchpad or a touchscreen.

Various features and aspects will be better understood with reference to the following description, drawings, and appended claims.

DETAILED DESCRIPTION

The words "embodiment," "variant," "example," "implementation," and similar words and expressions as used in this document refer to a particular apparatus, process, article of manufacture, or part of apparatus/process/article of manufacture, and not necessarily to the same apparatus, process, article of manufacture, or part thereof. Thus, "one embodiment" (or a similar word/expression) used in one place or context may refer to a particular apparatus, process, article of manufacture, or part thereof; the same or a similar expression in a different place or context may refer to a different apparatus, process, article of manufacture, or part thereof. The expression "alternative embodiment" and similar words and phrases are used to indicate one of a number of different possible embodiments, variants, examples, or implementations. The number of possible embodiments, variants, examples, or implementations is not necessarily limited to two or any other quantity. Characterization of an item as "exemplary" or listing an item following "for example," "for instance," or similar words/expressions means that the item is used for illustration. Such characterization does not necessarily mean that the embodiment, variant, example, implementation, or part thereof is a preferred one; the embodiment, variant, implementation, example, or part thereof may but need not be a currently-preferred embodiment, variant, implementation, example, or part thereof. All embodiments, variants, implementations, and examples are described for illustration purposes and are not necessarily strictly limiting.

The words "couple," "connect," and similar words/phrases/expressions with their inflectional morphemes do not necessarily import an immediate or direct connection, but include within their meaning connections through mediate elements.

A "movement mechanism" signifies a mechanical arrangement (as of wheels), an electrical arrangement (as an electrical motor), or a combination of mechanical and electrical arrangements, for causing a particular motion (as in a clock or watch).

"Conductive" means electrically conductive. Electrical conductivity of a plastic component or a part of the component can be achieved in different ways, including adding carbon black powder to the plastic material of the component as a filler, and metallization. "Metallization" may include metal coating or painting. Metallization may also include Physical Vapor Deposition (PVD) of a metal. The metal may include aluminum. In examples, the thickness of the deposited metal is over two microns. In more specific examples, the thickness of the deposited metal is 3-5 microns, as is typically used for EMI shielding.

The "horizontal" adjective/modifier applied to a touch-sensitive computer input device (touchpad, touchscreen) or a plane means that the device or the plane is in a substantially horizontal orientation, in which touchpads are commonly used when a laptop PC is placed on a desk or a table. "Horizontal" does not require the touchpad to be strictly horizontal. A touchpad inclining twenty degrees from a strictly horizontal orientation in any direction would still be horizontal.

Figure 1A:
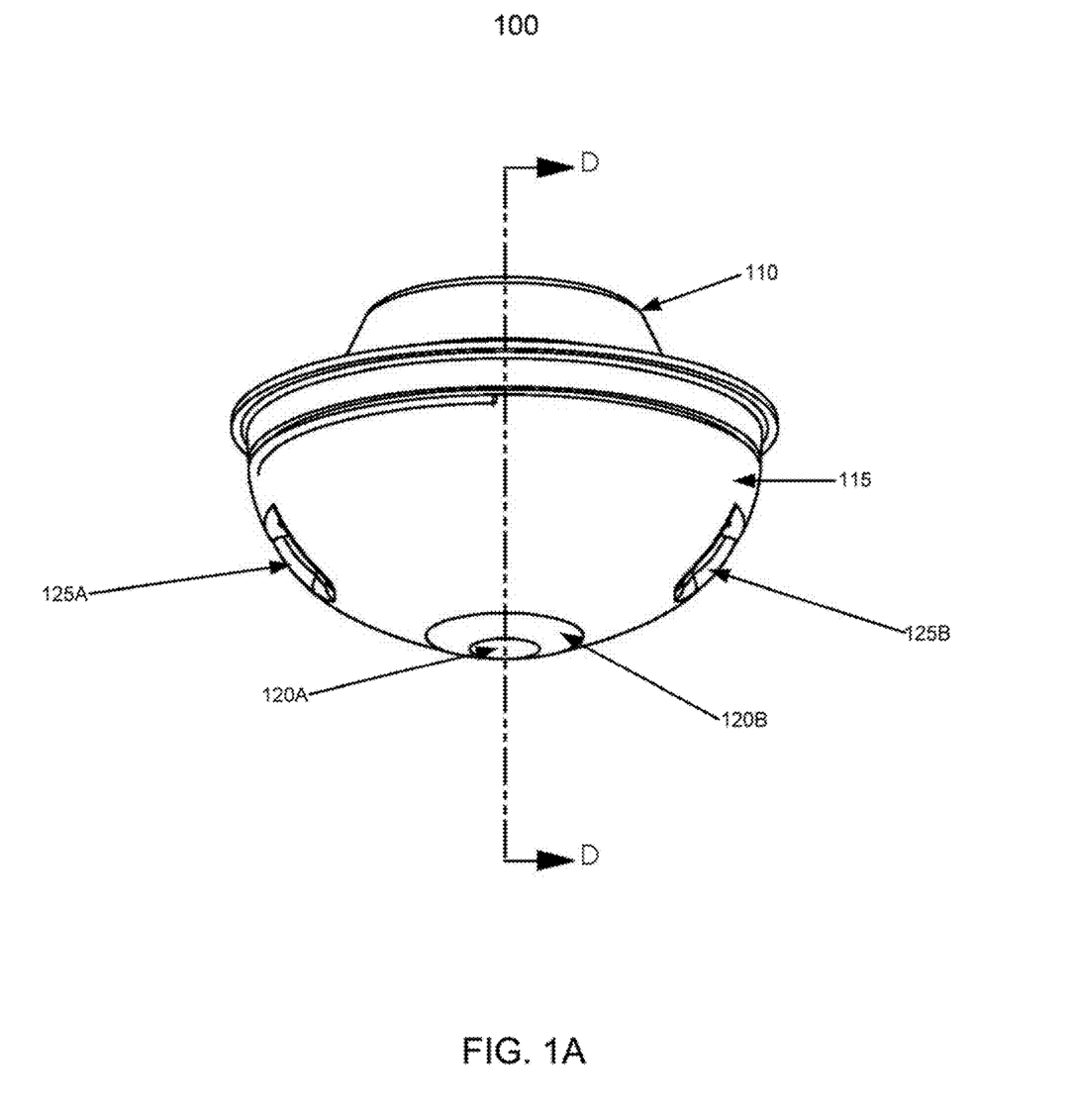
FIG. 1A is a perspective lower elevational view illustrating selected components of a device that simulates finger movement on touch-sensitive computer input devices such as touchpads.
Figure 1B:
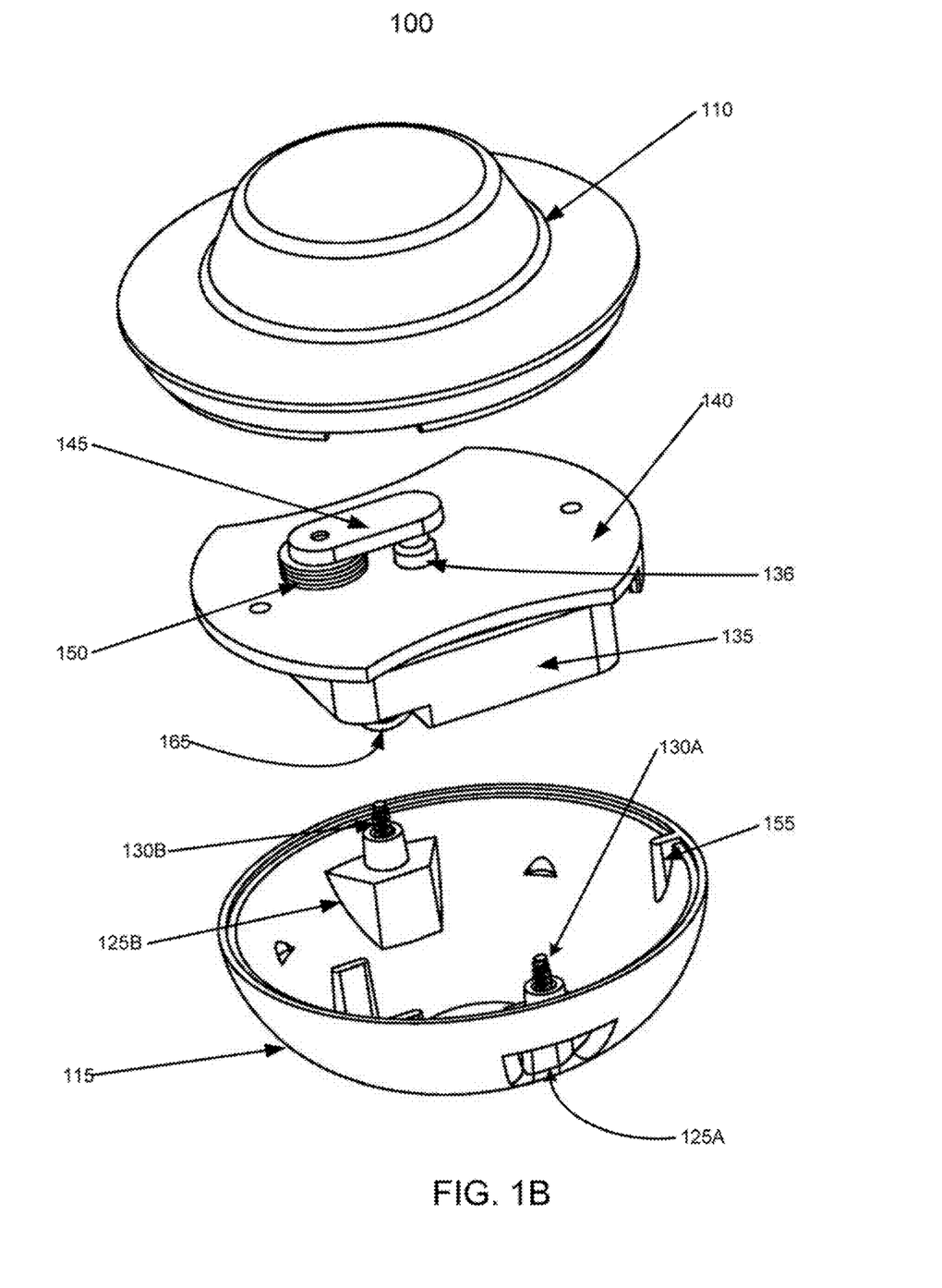
FIG. 1B is a perspective upper elevational exploded view illustrating selected components of the device of FIG. 1A.
Figure 1C:
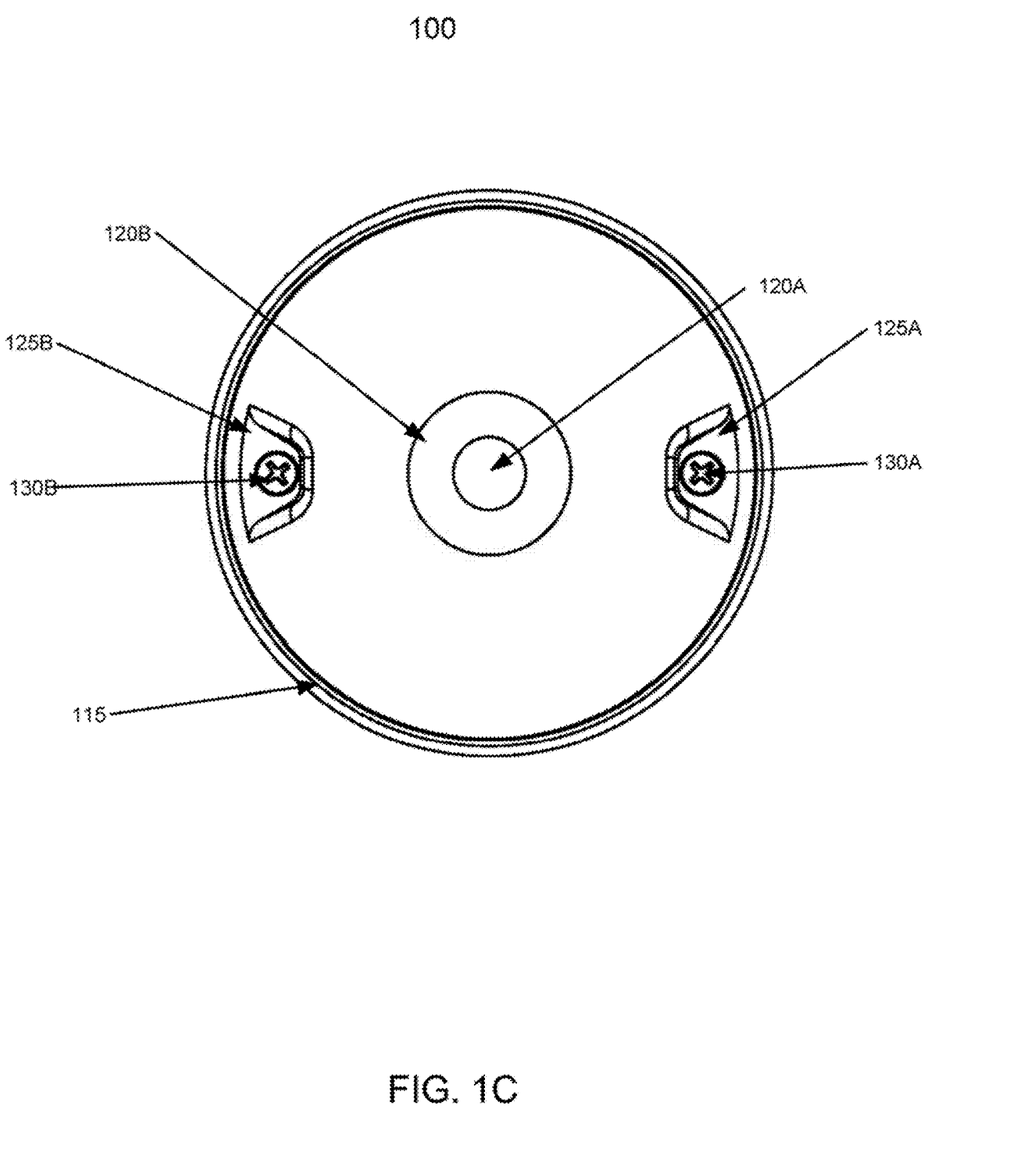
FIG. 1C is a bottom view illustrating selected components of the device of FIG. 1A.
Figure 1D:
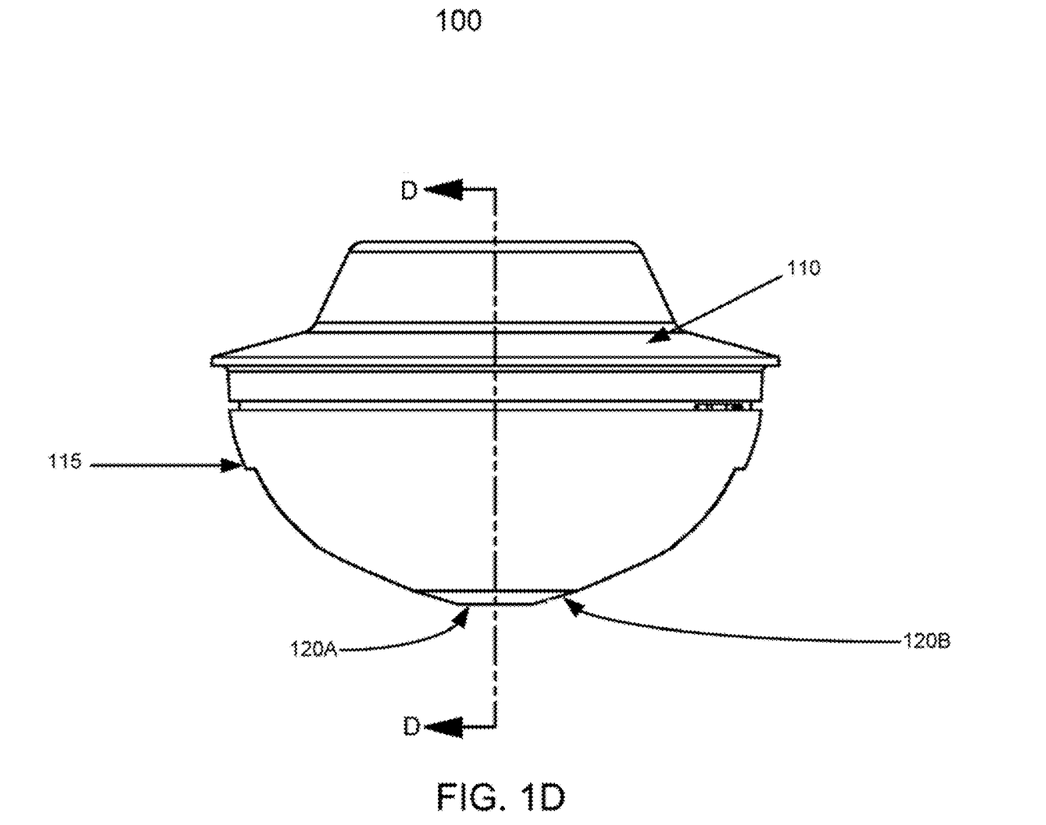
FIG. 1D is a side view illustrating selected components of the device of FIG. 1A.
Figure 1E:
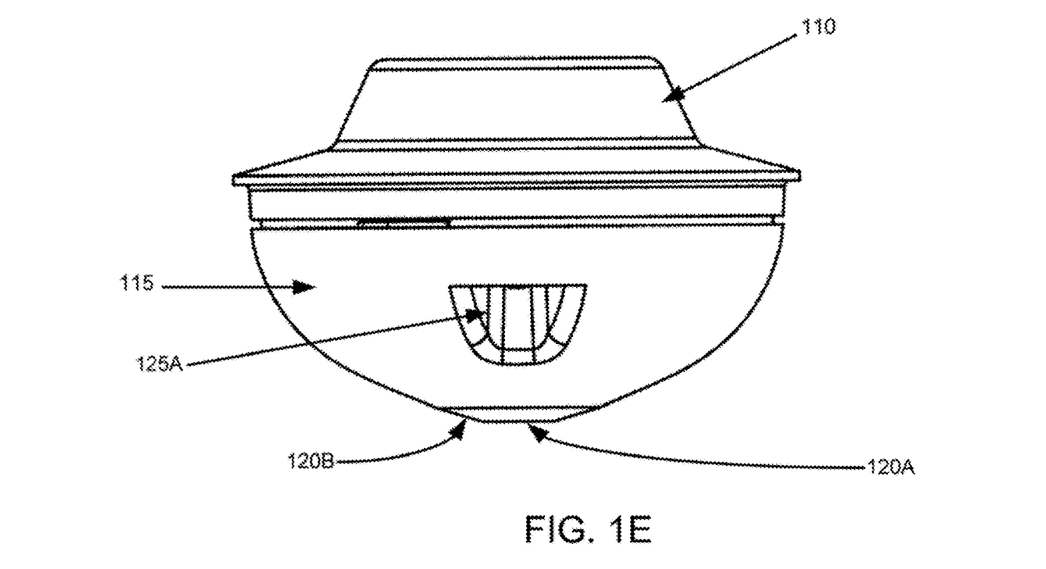
FIG. 1E is another side view illustrating selected components of the device of FIG. 1A.
Figure 1F:
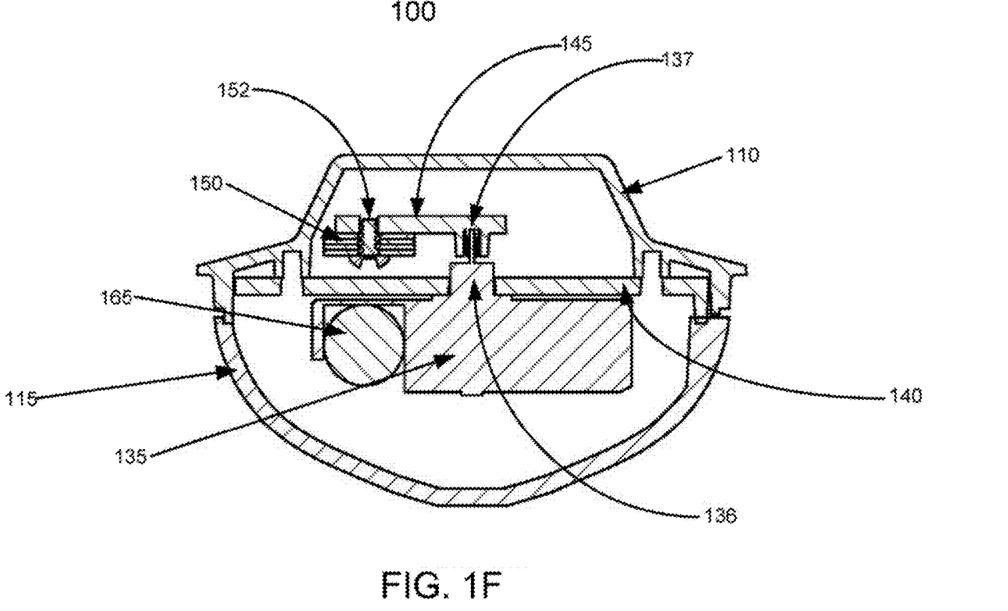
FIG. 1F is a sectional view along the cross-section D-D, illustrating selected components of the device of FIG. 1A.
Figure 1G:
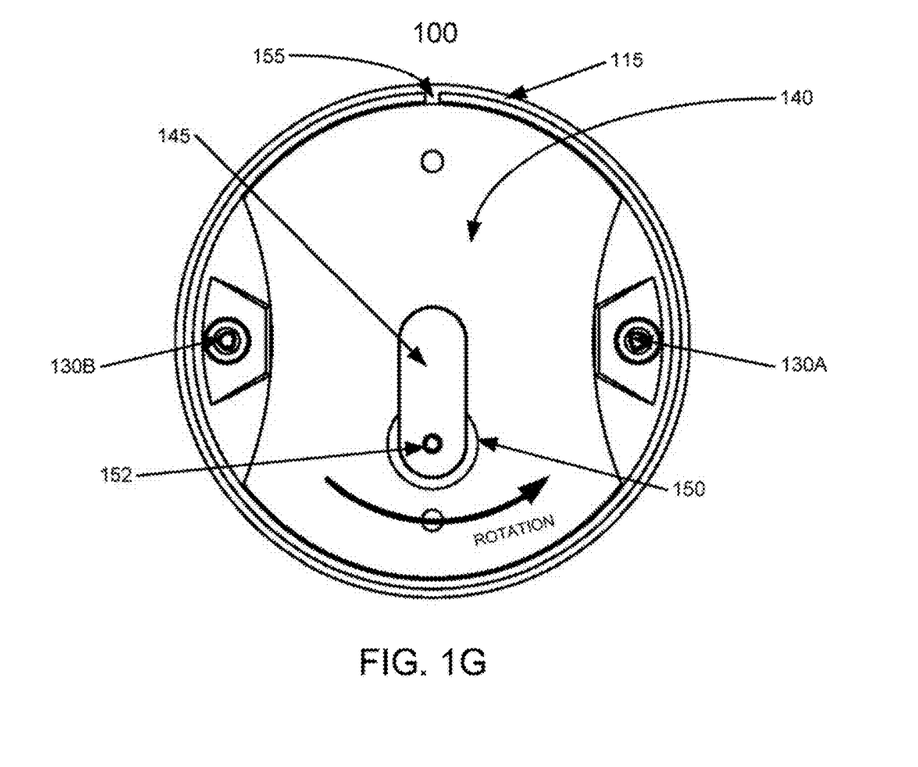
FIG. 1G is a top view illustrating selected components of the device of FIG. 1A with top cover removed.

FIGS. 1A through 1G illustrate selected features of a "wiggler" device 100 that can simulate circular finger movement on a touchpad. In particular, FIG. 1A is a perspective lower elevational view; FIG. 1B is a perspective upper elevational exploded view; FIG. 1C is a bottom view; FIG. 1D is a first side view; FIG. 1E is a second side view; FIG. 1F is a sectional side view along the cross-section D-D (shown in FIG. 1D); and FIG. 1G is a top view of the device with top cover removed.

The device 100 includes an upper cover 110 and a base 115, attached together (mated) with screws 130A and 130B that are inserted into, respectively, recesses 125A and 125B in the base 115. To facilitate assembly of the device 100, the inside of the base 115 has a protrusion 155 (FIG. 1B, near the base's outer circumference) that fits into a matching slot (not shown) near the outer circumference of the cover 110.

The cover 110 and the base 115 may be made of a plastic material. At least part of the base 115 is conductive at its lower outside portion, e.g., metalized. As shown in FIGS. 1, a conductive portion 120 is at the bottom of the base 115. In this embodiment, the conductive portion 120 includes a flat disk 120A surrounded by a conical band 120B. The total size of the conductive areas of the disk 120A and the conical band 120B may be such that a typical computer touchpad detects a finger touch when the device 100 is placed on it, whether vertically (supported by the disk 120A) or leaning to the side (supported by the conical band 120B). In examples, most or all of the outside of the base 115 is metalized. The inside of the base 115 may also be metalized, as may be the outside and/or the inside of the cover 110. In examples, the conductive conical band 120B is between one-quarter and one one-half inch in width, to simulate finger impression when it is in contact with a touchpad. The diameter of the disk 120A is over one-half inch in some variants.

Numeral 135 designates a movement mechanism (in the sense of a mechanical/electrical arrangement for causing a particular motion as in a clock or watch), such as an electric motor with or without reduction gear(s), powered by a battery 165. The movement mechanism 135 includes a projection 136 with a protruding shaft 137 that is rotated by the movement mechanism 135. A revolving arm 145 is attached on one end to the shaft 137 and revolves with the rotation of the shaft 137. A fat arrow in FIG. 1G designates one direction of rotation, but the opposite direction of rotation is also possible. A weight 150 is attached by a screw 152 to the opposite end of the revolving arm 145.

The movement mechanism 135 is attached to one side of a mounting shelf 140, so that the projection 136 and the shaft 137 protrude on the opposite side of the shelf 140 where the arm 145 is attached. The shelf 140 and the movement mechanism 135 are designed to fit in a predetermined location inside the device 100, so that the block (the shelf 140, the arm 145, the weight 150, the movement mechanism 135, and the battery 165) remains in a fixed place when the device 100 is assembled. With the block inside the device 100, the distributions of the masses of the components are such that the center of gravity of the device 110 varies with rotation of the arm 145 and the device 100 leans in the direction generally of the arm 145.

Figure 2A:
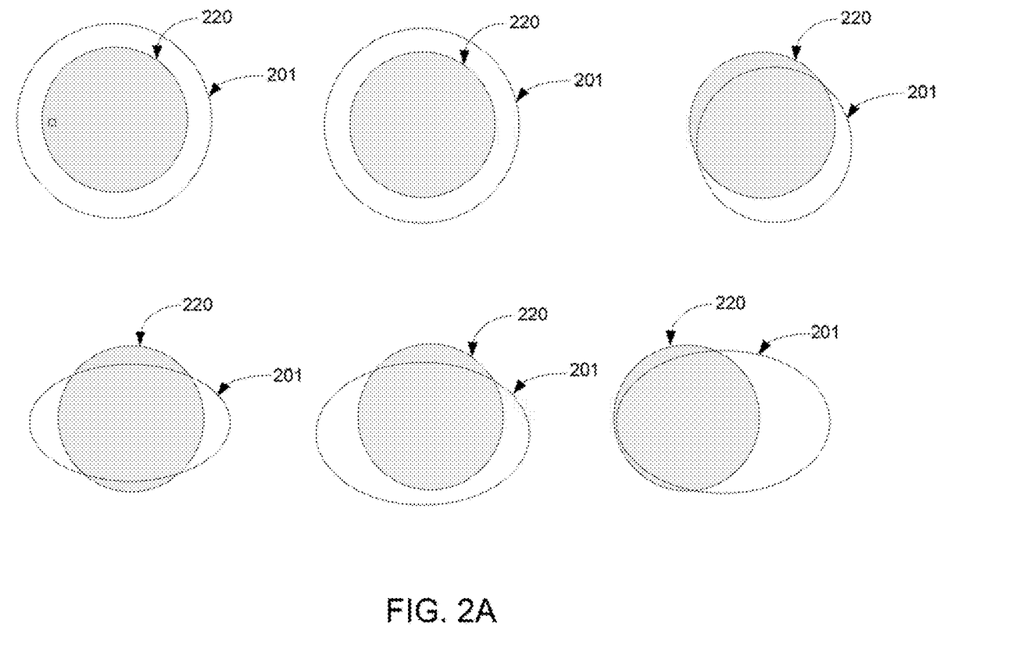
FIG. 2A and FIG. 2B illustrate exemplary curves that may be traced by the center of gravity of the device of FIG. 1A.

Now consider the device 100 placed on a horizontal surface (such as a horizontally-oriented touchpad) so that the conductive portion 120 rests on the surface. In some variants, for at least some angular positions of the arm 145 (and possibly most or all angular positions), the center of gravity of the device 100 in the horizontal plane falls outside the disk 120A in the horizontal plane, generally in the direction of the arm 145. In these variants, when the arm 145 makes a full circle around the shaft 137 and the device 100 is held in the straight position (not tilting, with the disk 120A in full contact with the horizontal surface), the projection of the center of gravity onto the horizontal surface traces a curve on the horizontal surface. The curve has at least one point or segment outside the projection of the disk 120A on the horizontal surface. Indeed, in some of these variants, the curve has most points, one or several segments, or even all points, outside the projection of the disk 120A. In operation, however, the device 100 is allowed to tilt and rest on its side that includes the conductive conical band 120B. The computing device then detects the moving contact patch between the touchpad and the conductive portion 120, which appears (to the computing device for which the touchpad serves as a user input) as finger movement. To avoid the possibility of detection of touchpad "taps" (which may lead to unintended computer action), the curves of some embodiments fall entirely outside of the disk 120A so that a continuous movement is detected, or the segments of the curve within the disk 120A and outside it correspond to relatively long time durations (e.g., >0.5 second) of contact of the conductive portion 120 with the touchpad within and outside the disk 120A. FIG. 2A illustrates several exemplary curves 201 that may be traced by the center of gravity of embodiments of the device 100 in relation to the circle 220 that delimits the periphery of the horizontal plane projection of the disk 120A of these variants. (Assume that the device 100 is held in a vertical position and not allowed to tilt during such tracing.) These are illustrative examples of curves that fall entirely or in part outside the circle 220.

Figure 2B:
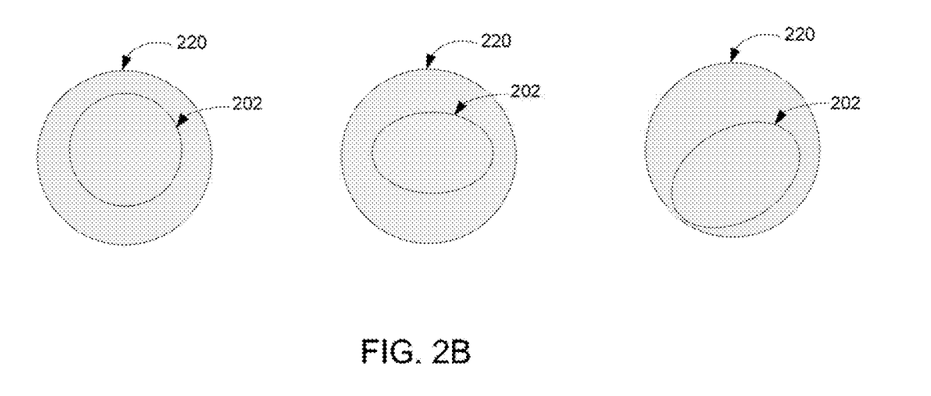
Figure 3A:
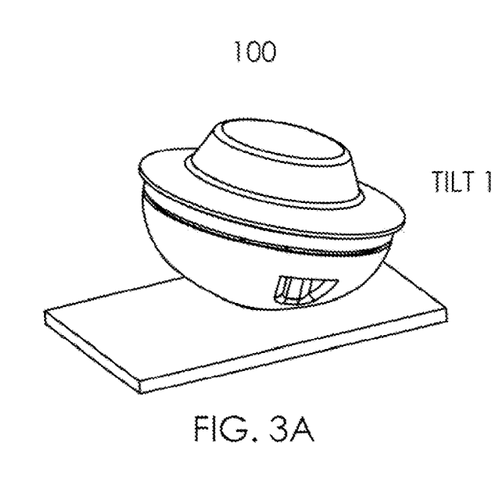
FIG. 3A, FIG. 3B, and FIG. 3C are perspective elevational views illustrating selected aspects of the device of FIG. 1A tilting in different directions.
Figure 3B:
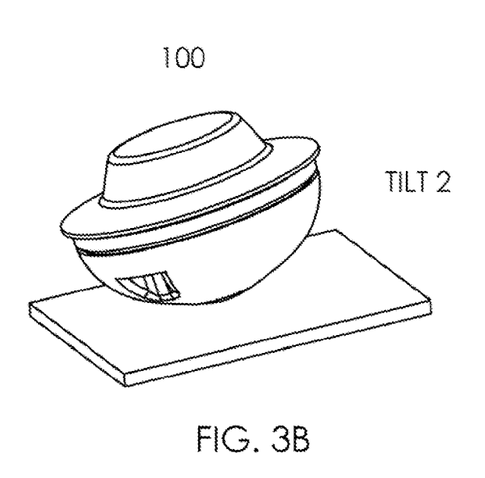
Figure 3C:
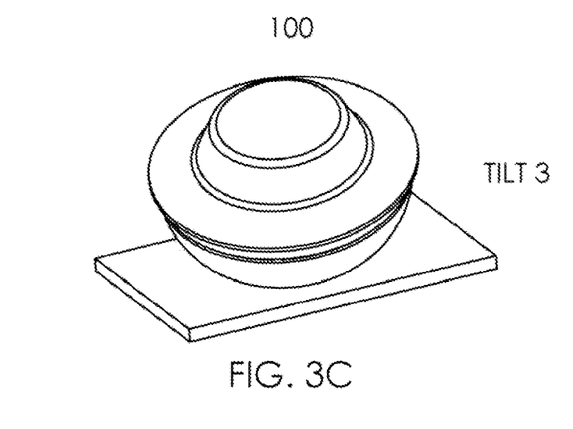
Figure 3D:
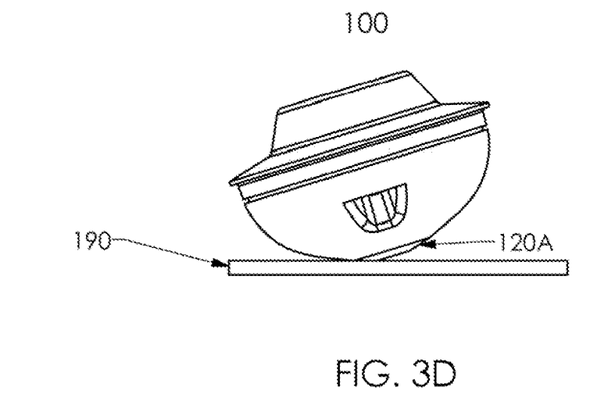
FIG. 3D is a side view illustrating selected components and aspects of the device of FIG. 1A resting on the conductive portion of its base and tilting.

In other variants, when the device 100 is placed on a horizontal touchpad with the disk 120A resting flatly on the touchpad, the horizontal projection of the center of gravity of the device 100 in the horizontal plane falls within the disk 120A for all angular positions of the arm 145 (with the device 100 in the vertical position). FIG. 2B illustrates several exemplary curves 202 that may be traced by the horizontal projection of the center of gravity of these variants in relation to the circle 220 that delimits the periphery of the disk 120A of these variants. In these variants, as the arm 145 makes a full circle around the shaft 137, the device 100 should remain resting on the touchpad with the disk 120A and the touchpad in contact with each other. In other words, the device 100 will not tilt to the side by itself. But if the device 100 is placed on its side (including the conical band 120B) onto the touchpad, the center of gravity for all angular positions of the arm 145 will be such that the device 100 will not regain by itself the vertical position in which the disk 120A rests fully on the horizontal surface of the touchpad. This is illustrated in FIGS. 3A, 3B, and 3C, which show in perspective the device 100 tilting in different directions (TILT 1, TILT 2, TILT 3) as the arm 145 revolves; and in FIG. 3), which is a side view of the device 100 tilting on a touchpad 190. Note that here the contact patch of the conductive portion 120 of the device 100 with the touchpad 190 is entirely within the conical band 120B. In these variants, as the arm 145 rotates, the device 100 will spin with its conductive conical band 120B on the touchpad 190. Therefore, the disk 120A need not be conductive. It suffices that the contact area between the conductive conical band 120B and the touchpad moves sufficiently to simulate finger movement on the touchpad. The disk 120A may be dispensed with altogether and the base may form a circle (rather than a disk) at its bottom. These variants allow the user to stand the device 100 vertically without worrying about it moving by itself, when simulating finger movement on the touchpad is not needed. On the other hand, when simulating finger movement is needed, the user can place the device 100 with its side on the touchpad, as is illustrated in FIG. 3D.

Note also that in examples the bottom portion of the base 115 does not have a flat portion such as the disk 120A, but curves outward/downward (like a ball), or inward.

The center of gravity of the device 100 and the curve traced by the contact area may be fine-tuned by adding inside the device additional material (e.g., plastic) in one or more locations, and/or holder(s) of weights (e.g., metal weights).

In variants, the movement mechanism 135 is of the type used in AA battery-powered wall or table clocks, using the second hand as the shaft 137. The gearing for the other hands of the clock movement mechanism (hour, minute) may be removed or not installed in the movement mechanism to begin with. Because the frequency of rotation is not critical (as long as the simulated finger movement is sufficient to prevent the computer from falling asleep), frequency stabilization components of the clock movement mechanism (including the quartz crystal) may also be omitted. In embodiments, the arm 145 rotates with an angular velocity of at least 0.4 rpm. For many computing systems, a lower angular velocity should also suffice. In variants, the arm 145 rotates with an angular velocity within ten percent of 1 rpm. This is convenient if a clock movement is used.

In variants, the movement mechanism 135 may be a mechanical movement mechanism, such as spring-operated movement mechanism in wind-up toys, music boxes, and mechanical clocks. In operation, the user winds-up the movement mechanism and places the device on the touchpad.

In variants, the weight at the end of the arm is integrated with the arm. The weight and shape of the arm are such that the changes in the center of gravity of the device 100 caused by the rotation of the arm are sufficient to cause the device 100 to lean in different directions, as was discussed above.

Figure 4A:
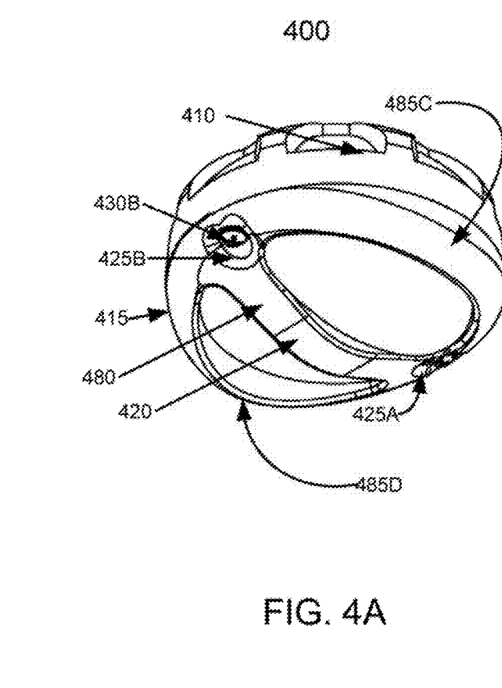
FIG. 4A is a perspective lower elevational view illustrating selected components of another device that simulates finger movement on touch-sensitive computer input devices such as touchpads.
Figure 4B:
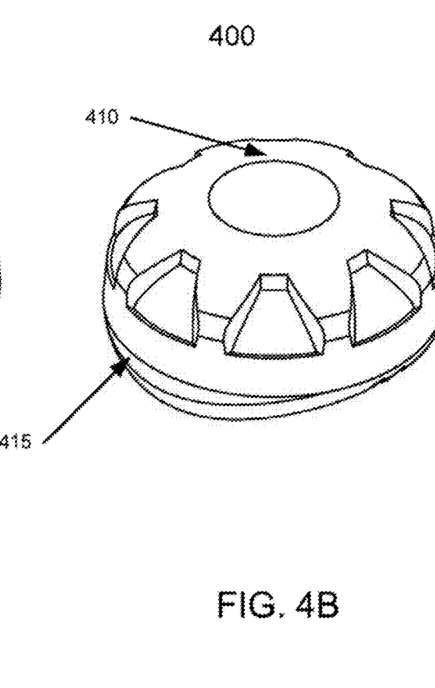
FIG. 4B is a perspective upper elevational view illustrating selected components of the device of FIG. 4A.
Figure 4C:
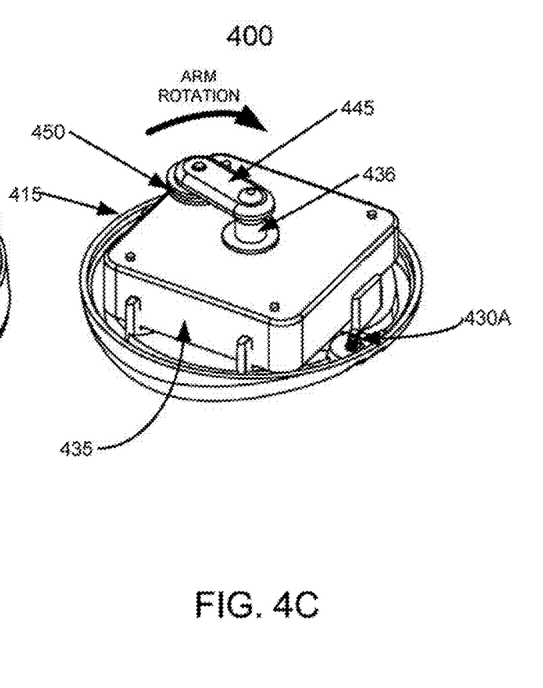
FIG. 4C is a perspective upper elevational view illustrating selected components of the device of FIG. 4A with top cover removed.
Figure 4D:
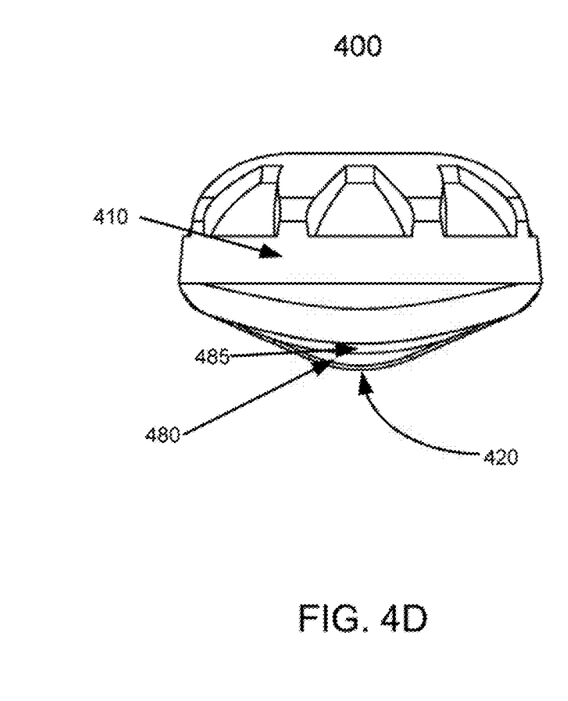
FIG. 4D is a first side view illustrating selected components of the device of FIG. 4A.
Figure 4E:
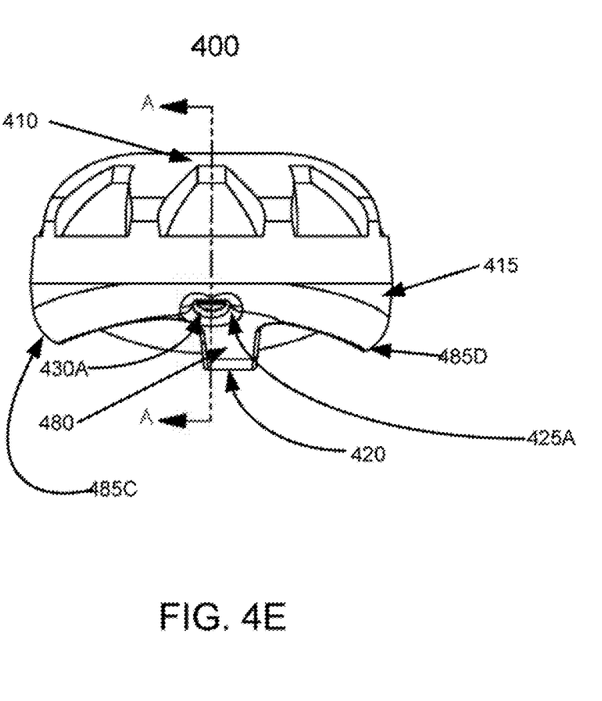
FIG. 4E is a second side view illustrating selected components of the device of FIG. 4A.
Figure 4F:
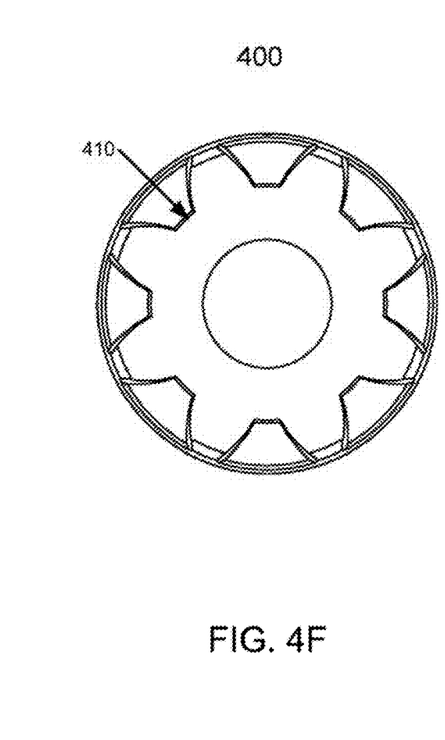
FIG. 4F is a top view illustrating selected components of the device of FIG. 4A.
Figure 4G:
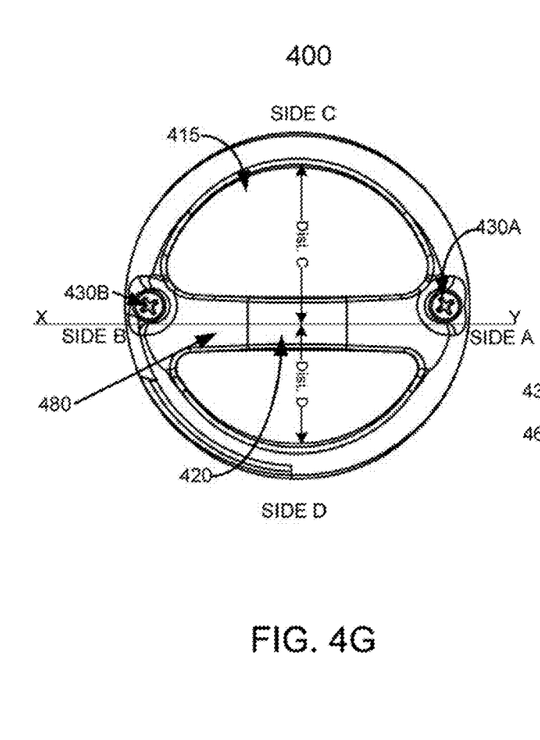
FIG. 4G is a bottom view illustrating selected components of the device of FIG. 4A.
Figure 4H:
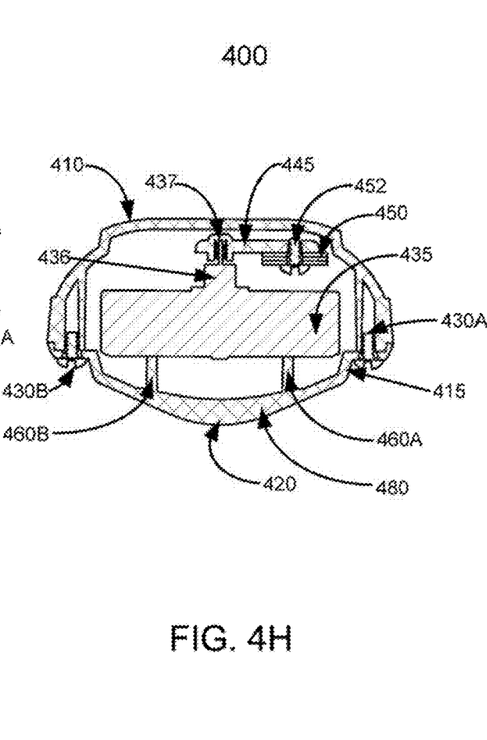
FIG. 4H is a sectional view illustrating selected components of the device of FIG. 4A along the cross-section A-A.
Figure 4I:
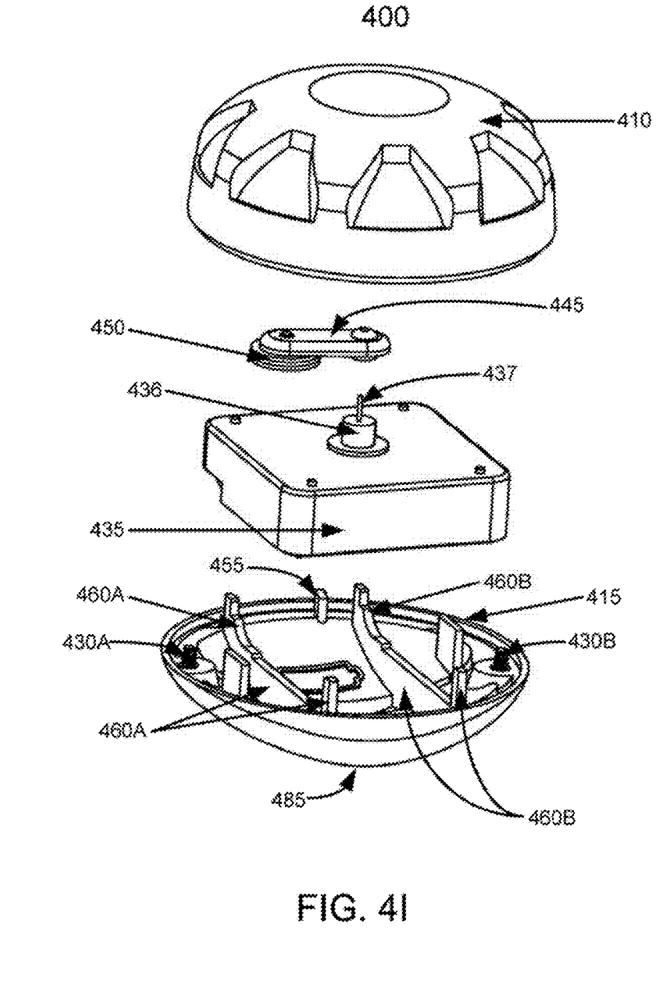
FIG. 4I is a perspective upper elevational exploded view illustrating selected components of the device of FIG. 4A.
Figure 4J:
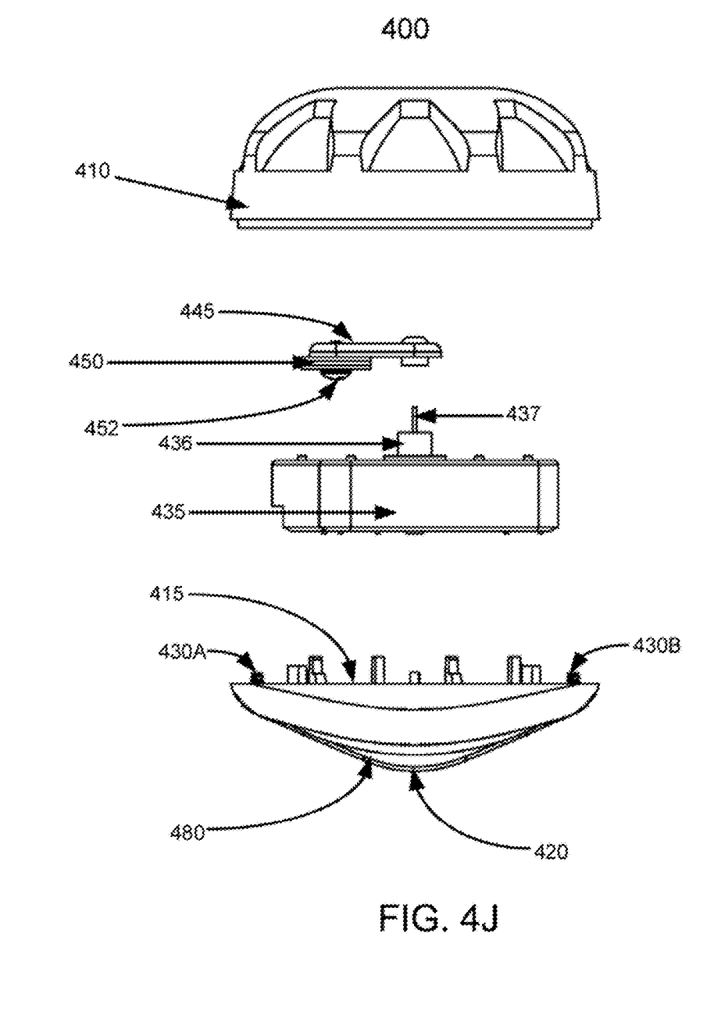
FIG. 4J is an exploded first side view illustrating selected components of the device of FIG. 4A.

FIGS. 4A through 4J illustrate selected features of another wiggler device 400 that can simulate oscillating linear finger movement on a touchpad. In particular, FIG. 4A is a perspective lower elevational view; FIG. 4B is a perspective upper elevational view; FIG. 4C is a perspective upper elevational view of the device with top cover removed; FIG. 4D is a first side view; FIG. 4E is a second side view (at 90 degrees to the first side) of the device; FIG. 4F is a top view; FIG. 4G is a bottom view; FIG. 4H is a sectional view along the cross-section A-A; FIG. 4I is a perspective upper elevational exploded view; and FIG. 4J is an exploded view of the first side.

The device 400 includes an upper cover 410 and a base 415, attached together with screws 430A and 430B that are inserted into, respectively, recesses 425A and 425B in the base 415. To facilitate assembly of the device 400, the inside of the base 415 has a protrusion 455 near its outer circumference rim that fits into a matching slot (not shown) at the outer circumference rim of the cover 410.

The base 415 has a convex (protruding outward, down) "ski" 480 on the bottom. In normal operation, the device 400 rests on a central portion 420 of this ski 480. As is illustrated here, the ski 480 is arc- or bow-shaped lengthwise, and flat across with a constant width. The constant width is substantially narrower than the diameter of the device 400 (diameter of the top 410 or the base 415). In variants, the width of the ski 480 at its central portion 420 is between one-quarter and one-half inch, to simulate finger impressions. In variants, the width of the ski 480 at its central portion 420 is less than one-third of the diameter of the device 400, though greater width is not necessarily precluded.

The base 415 also has side supports 485C and 485D, which help with initial user placement of the device on the touchpad.

The cover 410 and the base 415 may be made of plastic. At least part of the ski 480 is conductive at least at its central portion 420, e.g., metalized. The total size of the conductive area of the central portion 420 may be such that a typical computer touchpad detects a finger touch when the device 400 is placed on it. In examples, most or all of the outside of the ski 480 is metalized. Indeed, the entire base 415 may be conductive. The inside of the base 415 may also be metalized, as may be the outside and/or the inside of the cover 410.

Numeral 435 designates a movement mechanism, such as an electric motor with/without reduction gear(s), powered by a battery (obscured in the Figures). The movement mechanism includes a projection 436 with a protruding shaft 437 that is rotated by the movement mechanism 435. A revolving arm 445 is attached on one end to the shaft 437 and revolves with the rotation of the shaft 437. A fat arrow in FIG. 4C designates one direction of rotation, but the opposite direction of rotation is also possible. A weight 450 is attached by a screw 452 to the opposite end of the revolving arm 445.

Figure 5A:
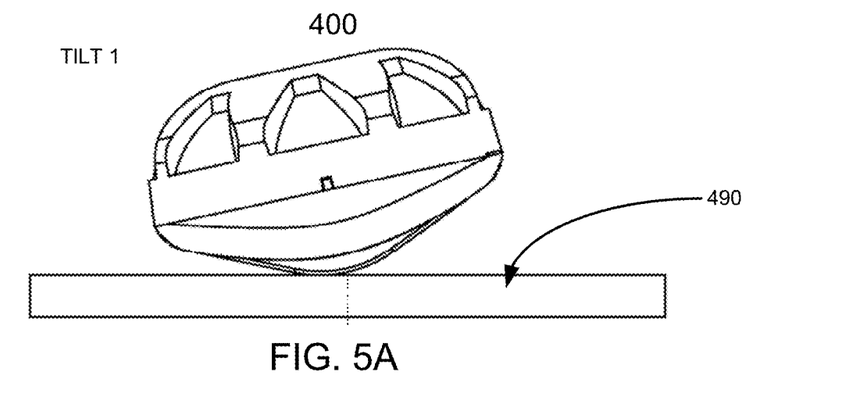
FIG. 5A, FIG. 5B, and FIG. 5C are side views illustrating selected components of the device of FIG. 4A rocking from one side to another.
Figure 5B:
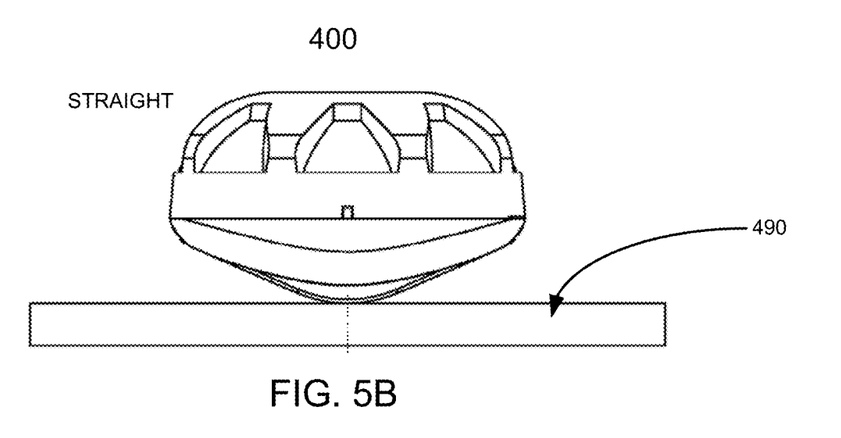
Figure 5C:
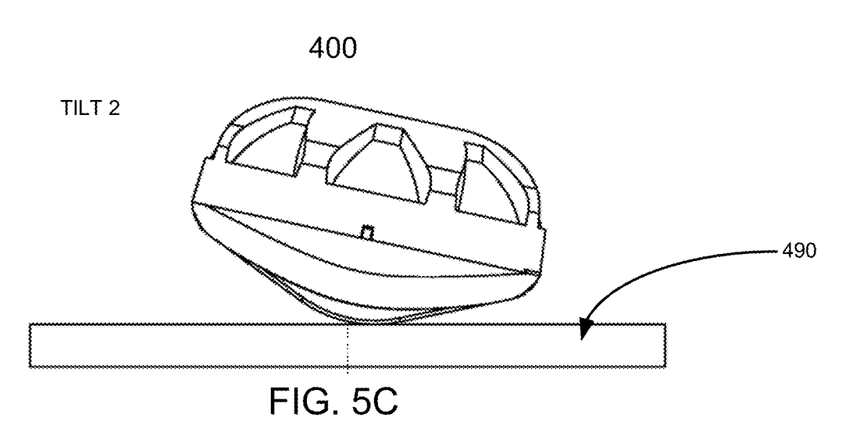

The movement mechanism 435 is shaped to fit in a predetermined fixed location inside the device 400, so that it with the attached battery, the arm 445, and the weight 450, are in the fixed location. In the illustrated embodiment, holding elements 460A and 460B are formed as part of the base 415 to hold the movement mechanism 435 in place horizontally and support it from below, while the inside structure of the top cover 410 restricts the movement mechanism 435 vertically from above. With the assembly (the movement mechanism 435, the battery, the arm 445, and the weight 450) inside the device 400, the distributions of the masses of the components are such that the center of gravity of the device 400 varies with rotation of the arm 445 and the device 400 leans/tilts lengthwise from side A to side B (as marked in FIG. 4G) and back on the ski 480, in the direction generally of the arm 445. Sidewise (side C, side D, as also marked in FIG. 4G), the device 400 may be balanced on the ski 480 and specifically on its central portion 420. Thus, as the arm 445 swings from side A to side B, the device 400 will be "rocking" back and forth lengthwise on the ski 480, and the motion of the conductive area of the central portion 420 on the touchpad simulates finger movement on the touchpad and keeps the computer from falling asleep. The "rocking" motion is illustrated in side views of FIG. 5A, FIG. 5B, and FIG. 5C. FIG. 5A is a side view showing the device 400 on a touchpad 490 tilting on the ski 480 to one side (TILT 1); FIG. 5B is a side view showing the device 400 not tilting (STRAIGHT); and FIG. 5C is a side view showing the device 400 tilting in the opposite side (TILT 2), as the arm 445 revolves around the shaft 437. The trajectory of the contact area between the device 400 and the touchpad 490 may be back and forth in a straight line.

The projection of the center of gravity of the device 400 in the horizontal plane falls preferably within the projection of the ski 480 in the horizontal plane for all of the angular positions of the arm 445. To facilitate such configuration, the ski 480 may be somewhat off-center of the circle formed by the circumference of the device 400, to account for the side C-to-side D imbalance of the weight distribution of the device 400. With reference to FIG. 4G, note that distance C from the centerline X-Y of the ski 480 to Side C is greater than distance D from the centerline to Side D.

As in the embodiment of FIGS. 1, the movement mechanism 435 may be of the type used in AA battery-powered wall or table clocks, using the second hand as the shaft 437. The gearing for the other hand (hour, minute) of the clock movement mechanism may be removed or not installed in the movement mechanism to begin with. Because the frequency of rotation is not critical (as long as the simulated finger movement is sufficient to prevent the computer from falling asleep), frequency stabilization components of the clock movement mechanism (including the quartz crystal) may also be omitted. In embodiments, the arm 445 rotates with angular velocity of at least 0.4 rpm, but for many computing systems, a lower angular velocity will also suffice. In variants, the arm 145 rotates with an angular velocity within ten percent of 1 rpm. The movement mechanism 435 may be a mechanical movement mechanism, such as spring-operated movement mechanisms in wind-up toys, music boxes, and mechanical clocks. In operation, the user winds-up the movement mechanism and places the device on the touchpad. The weight at the end of the arm may be integrated with the arm. The weight and shape of the arm are such that the changes in the center of gravity of the device 100 caused by the rotation of the arm are sufficient to cause the device 400 to tilt back and forth lengthwise on the ski 480, as was discussed above.

While this description speaks mostly of simulating finger movement on touchpads, the same apparatus may be used with touchscreens, including tablet computing devices.

The features described throughout this document may be present individually, or in any combination or permutation, except where the presence or absence of specific features (elements/steps/limitations) is inherently required, explicitly indicated, or otherwise made clear from the description. This applies whether or not features appear related to specific embodiments; thus, features of the different described embodiments/variant/examples may be combined.

Although the process steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary for proper operation in some embodiments in accordance with the concepts. It should be noted, however, that specific embodiments/variants/implementations/examples use the particular order(s) in which the steps and decisions (if applicable) are shown and/or described.

This document describes in detail the inventive wiggler/jiggler apparatus for simulating figure movements on computing apparatus touch-sensitive input devices. This was done for illustration purposes. Neither the specific embodiments of the invention as a whole, nor those of its features necessarily limit the general principles underlying the invention. The specific features described herein may be used in some embodiments, but not in others, without departure from the spirit and scope of the invention as set forth herein. Various physical arrangements of components and various step sequences also fall within the intended scope of the invention. Many additional modifications are intended in the foregoing disclosure, and it will be appreciated by those of ordinary skill in the art that in some instances some features of the invention will be employed in the absence of a corresponding use of other features. The illustrative examples therefore do not necessarily define the metes and bounds of the invention. The illustrative example also do not necessarily define the legal protection afforded the invention, which function will be carried out by the issued claims and their equivalents.

What is claimed is:

1. A device for simulating user activity on a touchpad, the device comprising:
   a movement mechanism including a shaft rotated by the movement mechanism when the movement mechanism is energized and allowed to operate;
   an arm comprising a first end and a second end, the first end being attached to the shaft so that rotation of the shaft causes the second end to revolve around the shaft;
   a base supporting the movement mechanism when the device rests on the touchpad, the base comprising an electrically conductive lower portion that touches the touchpad when the device rests on the touchpad, the electrically conductive lower portion having an area sufficient to simulate finger touch on the touchpad;
   wherein the second end revolving around the shaft changes the center of gravity of the device and causes the device to tilt in different directions and bring the electrically conductive lower portion to contact the touchpad in different locations thereby simulating finger movement on the touchpad.

2. The device of claim 1, wherein the movement mechanism comprises a mechanical movement mechanism.

3. The device of claim 2, wherein the mechanical movement mechanism comprises a wind-up spring mechanism.

4. The device of claim 1, wherein:
the movement mechanism comprises an electrical motor; and
the first end is attached to the shaft so that rotation of the shaft causes the second end to revolve around the shaft in a plane normal to the shaft.

5. The device of claim 4, wherein the movement mechanism further comprises one or more reduction gears, and wherein the shaft is driven by the electrical motor through the one or more reduction gears.

6. The device of claim 5, wherein the movement mechanism is configured to rotate the shaft at 0.4 rpm or faster.

7. The device of claim 5, wherein the movement mechanism is configured to rotate the shaft at 0.9 to 1.1 rpm.

8. The device of claim 5, wherein the movement mechanism is designed for operating clocks.

9. The device of claim 5, wherein the movement mechanism is designed for operating clocks with frequency stabilization components omitted.

10. The device of claim 5, wherein the movement mechanism is designed for operating clocks and the shaft is designed for rotating a clock second hand.

11. The device of claim 5, wherein the electrically conductive lower portion comprises a flat disk and a conical band.

12. The device of claim 11, further comprising an upper cover designed to mate with the base so that the movement mechanism is enclosed by the base and the upper cover, and the upper cover fixes the movement mechanism in the vertical direction when the upper cover is mated to the base.

13. The device of claim 12, further comprising a weight attached to the second end of the arm, to increase changes in location of the center of gravity of the device with rotation of the arm.

14. The device of claim 5, wherein:
the electrically conductive lower portion comprises a ski, the ski comprising a convex constant-width arc-shaped portion on which the device is balanced for at least some angular locations of the arm when the device is placed on the touchpad, the rotation of the arm causing the device to rock back and forth along the ski.

15. The device of claim 14, wherein the constant width of the ski is less than one-third of the width of the device.

16. The device of claim 14, wherein the ski is off-center so that length-wise center line of the ski is nearer one side of the device than an opposite side of the device.

17. The device of claim 14, further comprising an upper cover configured to mate with the base so that the movement mechanism is enclosed by the base and the upper cover, and the upper cover fixes the movement mechanism in the vertical direction when the upper cover is mated to the base.

18. The device of claim 17, wherein:
the base further comprises a first support on a first side of the ski and a second support on a second side of the ski.

19. An apparatus for simulating finger movement on a horizontally-placed touch-sensitive computing input device, the apparatus comprising:
a body having a conductive lower portion;
a weight inside the body;
a movement mechanism configured to move the weight inside the body thereby causing changes in location of the center of gravity of the apparatus in the horizontal plane when the apparatus is placed on the touch-sensitive computing input device;
wherein region of the touch-sensitive computing input device that is in contact with the conductive lower portion when the apparatus is placed on the touch-sensitive computing input device moves on the touch-sensitive computing input device in response to the changes in the location of the center of gravity thereby causing a computing apparatus coupled to the touch-sensitive computing input device to detect apparent finger movement on the touch-sensitive computing input device.

20. A method for simulating finger movement on a horizontally-placed touch-sensitive computing input device, the method comprising:
placing an apparatus on the touch-sensitive computing input device, the apparatus comprising a body with a lower conductive portion that is in contact with the touch-sensitive computing input device, a weight movable inside the body, and a movement mechanism attached to the weight and configured to move the weight when the movement mechanism is energized; and
energizing the movement mechanism to move the weight inside the body and generate horizontal changes in the center of gravity of the apparatus, the changes in the center of gravity of the apparatus causing the apparatus to tilt in different directions on the touch-sensitive computing input device and thereby vary location of the touch-sensitive computing input device in contact with the lower conductive portion so that a computing apparatus receiving input from the touch-sensitive computing input device detects apparent finger movements on the touch-sensitive computing input device.

* * * * *

UNITED STATES PATENT AND TRADEMARK OFFICE
CERTIFICATE OF CORRECTION

| | |
|---|---|
| PATENT NO. | : 11,762,488 B1 |
| APPLICATION NO. | : 17/863738 |
| DATED | : September 19, 2023 |
| INVENTOR(S) | : Evgeny Korol et al. |

It is certified that error appears in the above-identified patent and that said Letters Patent is hereby corrected as shown below:

In the Specification

Column 7, Line 23, cancel "FIG. 3)," and replace with --FIG. 3D,--.

Signed and Sealed this
Seventeenth Day of October, 2023

Katherine Kelly Vidal
*Director of the United States Patent and Trademark Office*